June 25, 1940.     W. H. SILVER     2,205,752
DAM FORMING DEVICE
Filed Jan. 22, 1938     3 Sheets-Sheet 1

INVENTOR.
WALTER H. SILVER
BY
ATTORNEYS.

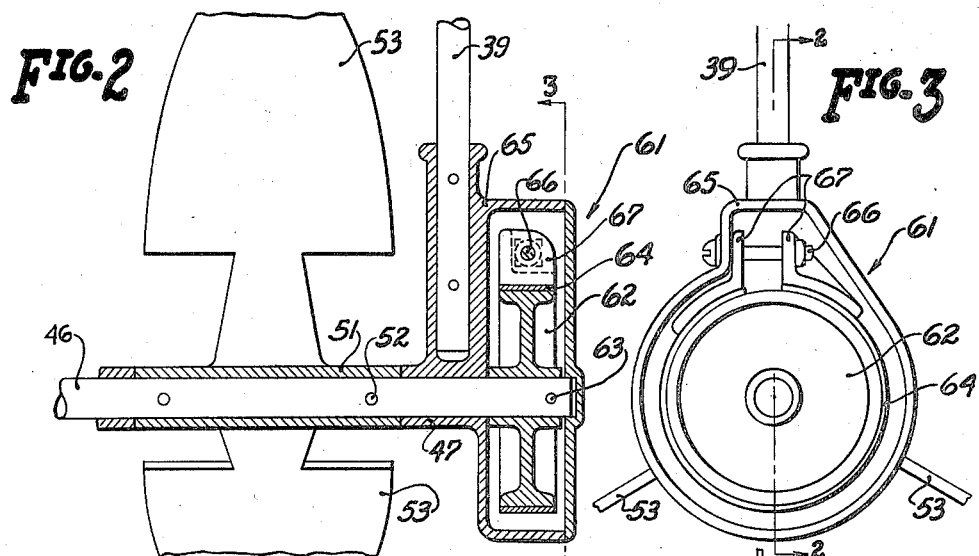
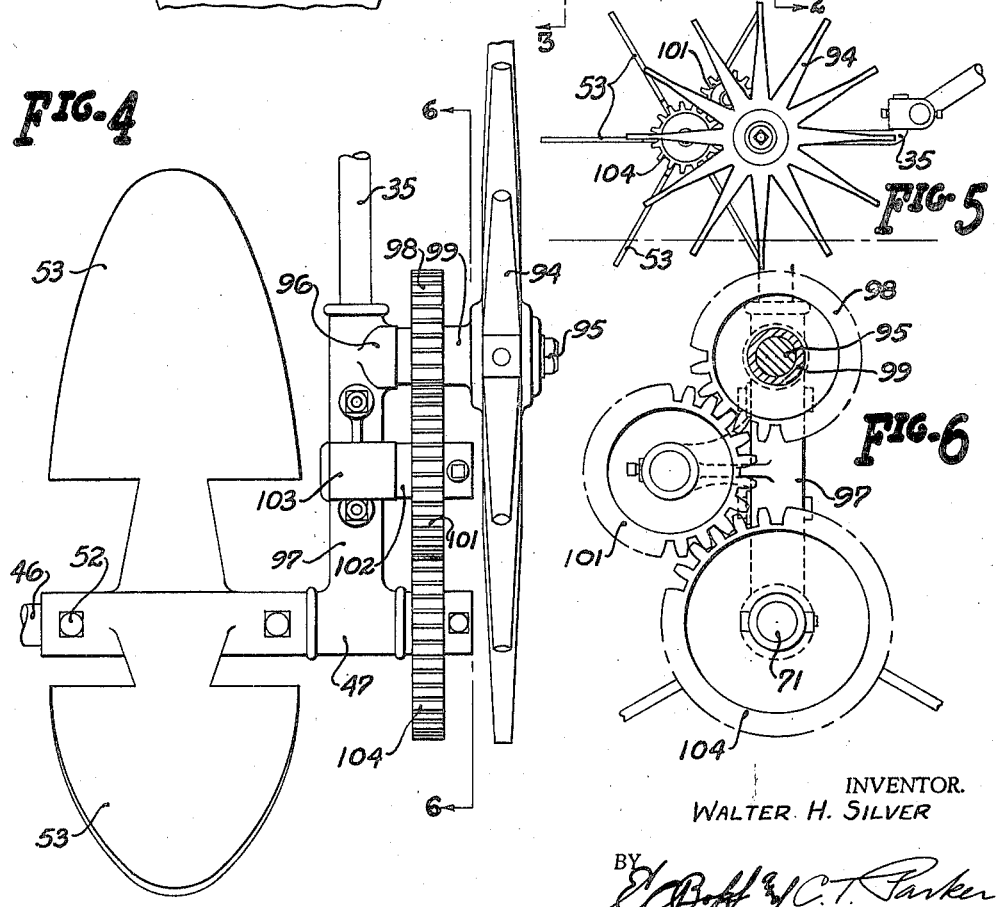

June 25, 1940.  W. H. SILVER  2,205,752
DAM FORMING DEVICE
Filed Jan. 22, 1938   3 Sheets-Sheet 3
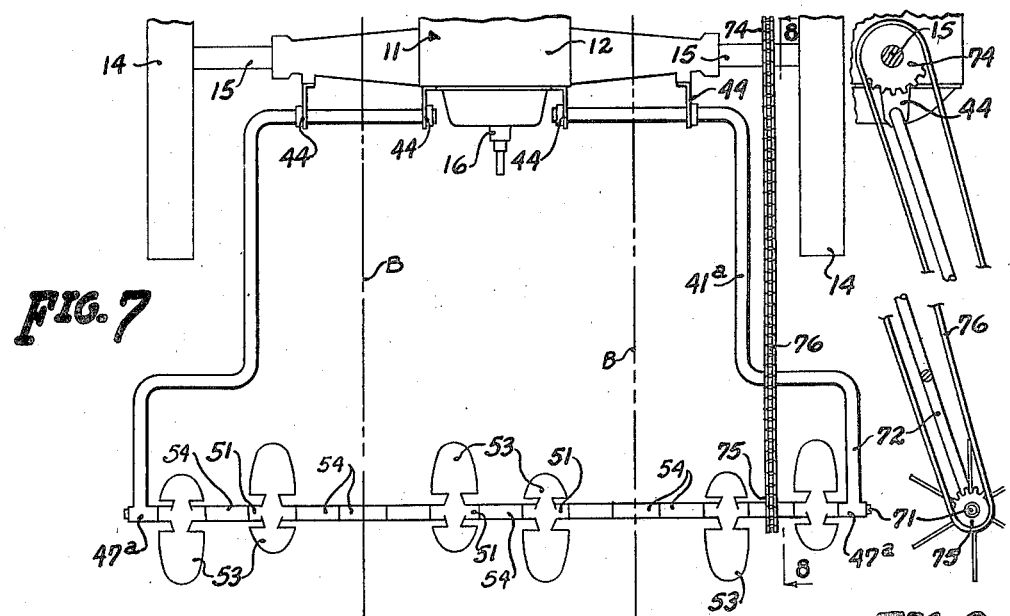
FIG. 7
FIG. 8
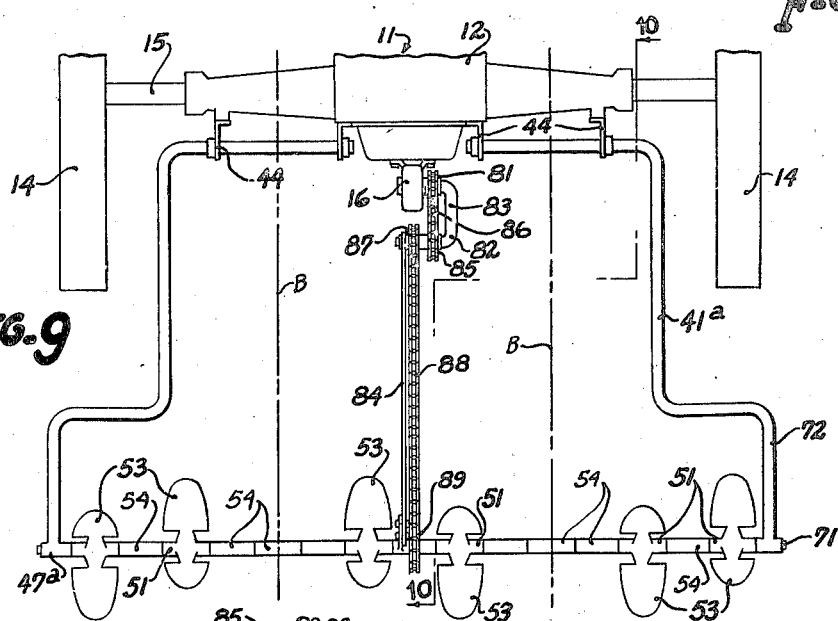
FIG. 9
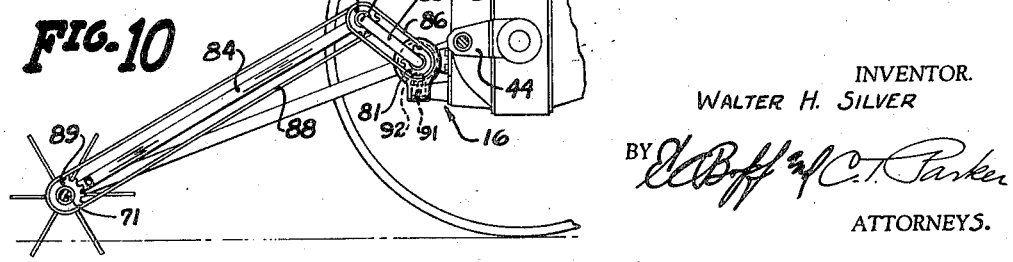
FIG. 10
INVENTOR.
WALTER H. SILVER
BY
ATTORNEYS.

Patented June 25, 1940

2,205,752

UNITED STATES PATENT OFFICE 2,205,752

DAM FORMING DEVICE

Walter H. Silver, Moline, Ill., assignor to Deere & Company, Moline, Ill., a corporation of Illinois Application January 22, 1938, Serial No. 186,397

21 Claims. (Cl. 97—52)

My invention relates to improvements in dam forming implements and pertains more particularly to an implement of this class which is adapted to be used behind a row crop cultivator to gather the soil into small piles or dams and form pockets or depressions to retain the rainfall, thereby providing sufficient moisture for the growing crop and preventing soil erosion.

The principal object of my invention is to construct an implement of this type which is adapted to be operated in the soil between the rows of such crops as corn, etc., without interfering with or injuring the plants.

Another object of my invention is to provide a simplified pocket forming device. More specifically, it is my object to provide a device having a rotatable assembly of soil engaging blades which is continuously rotatable instead of intermittently rotative as in other devices of this general type which employ mechanism for alternately restraining the rotary blade assembly against rotation and releasing it to allow the accumulated earth to be deposited. In the accomplishment of this object I have found that by rotating the damming device at a speed slightly slower than its free rolling speed, suitable moisture retaining pockets will be formed.

A further object is to provide, in a structure of this kind, means for regulating the speed of rotation of the soil engaging member relative to the speed of the tractor to increase or decrease the distance between the piles of accumulated soil to vary the size of the pockets formed.

Other and further objects will appear from the following detailed description of an embodiment of my invention illustrated in the accompanying drawings, in which Figure 1 is a diagrammatic plan view of a conventional type of row crop tractor showing a two-row cultivator mounted at the front end and showing the preferred form of my improved type of dam forming implement attached to the rear end, wherein the dam forming blades are rotated through contact with the ground;

Figure 2 is an enlarged sectional plan view taken on the plane of line 2—2 of Figure 3 and showing a brake device used to retard the rotation of the dam forming blade shaft;

Figure 3 is a side elevational view of the brake, taken substantially on the plane of line 3—3 of Figure 2;

Figure 4 is a detail view on an enlarged scale showing a modified form of drive for the dam forming blades which embodies a picker wheel adapted to operate in engagement with the ground and connected through a train of gears to drive the blades;

Figure 5 is a side elevational view of the structure shown in Figure 4;

Figure 6 is an elevational view taken on the plane of line 6—6 of Figure 4;

Figure 7 is a fragmentary plan view of the rear end of a tractor showing a modified form of dam forming implement attached thereto, wherein the blades are rotated by power obtained from the rear axle of the tractor;

Figure 8 is an elevational view of the drive shown in Figure 7 and taken on the plane of line 8—8 of that figure;

Figure 9 is a plan view similar to Figure 7 but illustrating a means for driving the dam forming blades from the power take-off of the tractor; and Figure 10 is a sectional view taken on the plane of line 10—10 of Figure 9.

Figure 1:
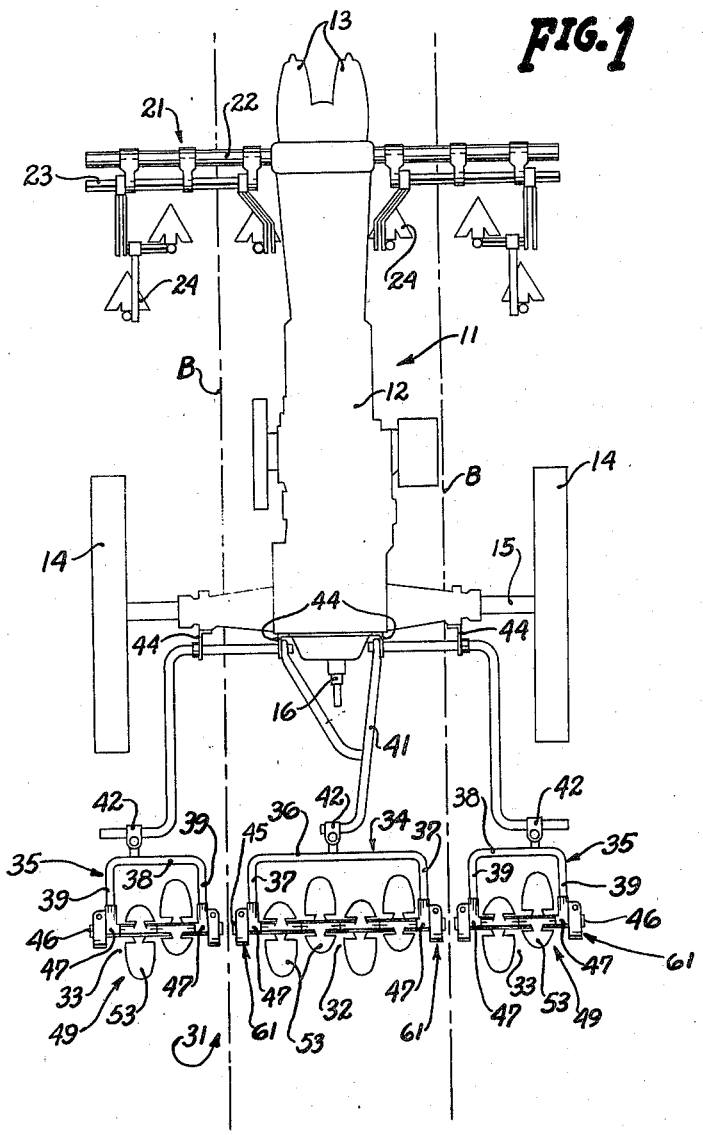

The tractor 11, shown in outline in Figure 1, is of conventional design and includes a body portion 12, front dirigible wheels 13 and rear drive wheels 14. The rear wheels 14 are mounted on a transverse drive axle 15 which extends laterally beyond the outer ends of a transmission housing formed on the rear end of the body 12. A power take-off device 16 is attached to the rear end of the tractor and is driven from the tractor engine.

A two-row cultivator structure 21 is supported on the front end of the tractor body 12, rearwardly of the dirigible wheels 13 in the usual manner and comprises a transverse tool supporting bar 22, a rock shaft 23 and a plurality of cultivator rigs 24. The structural details of the tractor and cultivator do not concern the present invention but are shown diagrammatically to better illustrate the features of the invention. Therefore, a more detailed description of these is not required.

The dam forming implement shown in Figure 1 attached to the rear of the tractor body 12, is referred to in its entirety by numeral 31. The implement 31 comprises a center section 32 and two side sections 33. The center section 32 is positioned directly behind the center of the tractor body 12 and the side sections are disposed in spaced transverse alignment with the center section and at opposite sides thereof. The sections 32 and 33 are provided with forwardly extending U-shaped frames 34 and 35, respectively. The frame 34 of the center section 32 includes a front transverse member 36, and side members 37 which are secured to each end of the member 36 and extend rearwardly therefrom. The frames 35 of the side sections 33 are of similar design to the frame 34 but of somewhat smaller size, and each includes a transverse member 38 and side members 39. The frames 34 and 35 are connected to a draft member 41 by means of clevis devices 42 which are attached to the transverse members 37 and 38 and to the draft member 41. The clevis devices 42 constitute universal connections between the implement and the draft member to allow the implement to follow irregularities of the ground. The draft member 41 is mounted for vertical swinging movement in brackets 44 which are secured on the rear of the tractor 11. Tool supporting shafts 45 and 46 are provided for the frames 34 and 35, respectively, and are journaled in bearings 47 which are secured on the rear ends of the side members 37 and 39 of the frames 34 and 35. A plurality of soil engaging units 49 are mounted on the shafts 45 and 46 and rotate therewith. Each of the units 49 includes a hub 51 which is fixed on the supporting shaft by means of bolts 52 (Figure 2). Soil engaging blades 53 are formed integral with the hubs 51, three blades being secured on each hub. The blades 53 are equidistantly spaced around the hub 51 and project outwardly therefrom. The units 49 are arranged in staggered relation on the supporting shafts 45 and 46 so that the blades 53 may be successively brought into engagement with the ground as the implement is advanced. By reason of their contact with the ground, the blades 53 are rotated as the implement is moved forwardly. The blades 53 normally rotate at a slower peripheral speed than the speed of advance of the implement in order to produce a dragging action of the blades in the ground and thus form pockets or depressions therein. To accomplish this a brake structure 61 is provided at each end of the shafts 45 and 46. Referring to Figures 2 and 3 of the drawings, the structure 61 includes a brake drum 62 which is fixed on the shaft by means of a bolt or similar securing means 63, and a brake band 64 supported on the frame member and adapted to engage around the drum 62. The brake members 62 and 64 are enclosed within a housing 65 which is preferably formed integral with the frame. An adjusting bolt 66 extends inwardly through the housing 65 and through aligned holes provided in clips 67 secured on the ends of the brake band 64 by means of which the band 64 may be adjusted and through which it is supported. Tightening the bolt 66 causes the brake band to grip the drum with greater retarding force, thereby retarding the speed of rotation of the rotary blades. This results in longer pockets and higher dams. Loosening the bolt 66 has the opposite effect, the limit in this direction of adjustment being a free rolling action of the blades with no accumulation of earth.

In Figures 7 and 9 of the drawings are shown two modifications of the implement, both of which are constructed in a single unit, wherein the soil engaging blades 53 are mounted on a transverse tool supporting shaft 71, which extends across the entire width of a frame 72 and is journaled in bearings 47a secured on the rear ends of the frame. The blades 53 are spaced apart laterally by spacing collars 54 which are provided on the shaft 71 between the hubs 51 of the blades. The blades 53 are shown as disposed in pairs. However, the lateral spacing of the blades may be varied if desired to arrange them in gangs of three or more by arranging the collars and blades in a different spaced relation. The frame 72 is preferably formed integral with the draft member referred to by numeral 41a which is swingably mounted in the supporting brackets 44 secured on the rear of the tractor 11. In the structure shown in Figures 7 and 8, the shaft 71 is driven by power supplied from the rear axle 15 of the tractor. Sprockets 74 and 75 are provided on the axle 15 and shaft 71, respectively, and a drive chain 76 is trained over these sprockets. The sprockets 74 and 75 are of such relative size as to cause the blades 53 to rotate at a slower peripheral speed than the speed of the implement for the purpose as previously described in connection with the structure shown in Figure 1. The type of drive employed for rotating the soil engaging blades in the modified form of the implement shown in Figures 9 and 10, is operated from the power take-off 16 of the tractor. In the present structure the power take-off shaft is mounted on the rear of the tractor and is provided with a drive sprocket 81. A counter shaft 82 is disposed rearwardly of the tractor 11 and is supported on arms 83 and 84 which are swingably connected with the tractor 11 and the shaft 71, respectively. A sprocket 85 is journaled on the countershaft 82 and is adapted to receive a drive chain 86 which is also trained over the sprocket 81. A sprocket 87 is formed integral with the sprocket 85 and a drive chain 88 is trained over this sprocket and over a sprocket 89 fixed on the shaft 71. The power take-off 16 is equipped with a worm 91 and a worm gear 92, see Figure 10, which are of such proportions as to provide the proper speed reduction to produce the desired R. P. M. for the tool shaft 71.

Another modification of the drive for the shaft 46 of the dam forming tool is shown in Figures 4, 5 and 6, and is applied to an implement of the single unit type such as is shown in Figure 1. The features of the present modification embody a picker wheel 94 which is fixed on a stub shaft 95 journaled in a bearing 96. The bearing 96 is formed in a bracket 97 which is provided at the lower or rear end of the frame 35. A drive gear 98 is fixed on a projecting sleeve 99 formed on the picker wheel 94, and meshes with an intermediate gear 101. The gear 101 has a laterally extending hub or trunnion 102 which is journaled in a bearing 103 mounted on the bracket 97. The intermediate gear 101 meshes with a driven gear 104 which is fixed on the end of the blade supporting shaft 46. With this arrangement, when the implement is advanced, the picker wheel, through its engagement with the ground, serves to positively drive the shaft 46. The gears 98, 101 and 104 are of such diameter that the shaft 46 will be rotated at a peripheral speed slower than the advance of the implement so that the blades 53, as they are moved through the ground, will form pockets or depressions of the desired size.

As illustrated in the drawings, both the preferred embodiment and the modified forms of my dam forming implement are of such designs as may be used in fields wherein the crop is planted in rows. Referring to Figures 1, 7 and 9, the rows of crop are indicated by the dotted lines B. To accommodate the implement to operation under conditions of this kind, the soil engaging units are arranged in gangs which are spaced apart to operate at opposite sides of the rows B. In the structure shown in Figure 1, as previously described, the units 49 are arranged in three gangs which are mounted for independent movement. The center gang is of sufficient width to extend across the entire space between the adjacent crop rows. The outer gangs are half the width of the center gang and operate over half the space at the opposite sides of these rows; the remaining portion of the space being worked on the next round of the implement. In the modified structures shown in Figures 7 and 9, the blades 53 are shown as arranged in pairs which operate on the ground between the rows of crop. However, as previously described, this relative spacing may be changed to accommodate the implement to different row spacings or to different kinds of crops by arranging the blades and collars in a different spaced relation.

While the foregoing specifically illustrates and describes several preferred embodiments of the features of my invention, I wish it to be understood that it is not limited to such specific construction, except insofar as claims may be directed thereto, as it will be apparent that various other changes and modifications of such structure may be made without departing from my invention.

What I claim is:

1. In combination with a tractor comprising a wheel supported frame adapted to travel between crop rows, cultivating tools supported on said frame and adapted to work the soil between said rows, and means disposed behind said cultivating tools and between said crop rows for digging out moisture retaining pockets in the loose, cultivated soil between the rows, said means including a transversely disposed rotatable shaft, draft means journaled on said shaft and connected to said tractor, and a plurality of radially extending, earth-engaging scraper blades mounted on said shaft, said blades being of appreciable width compared to their length and adapted to scoop out water retaining basins in the soil.

2. A device of the class described comprising a horizontally disposed, rotatable shaft, a plurality of earth-engaging basin-forming blades mounted on said shaft and extending substantially radially therefrom, draft means for said device, and means for determining the speed of rotation of said blades at a substantially constant peripheral speed as the device moves forwardly, which is different from the speed of advance of said device so that said blades are intermittently scraped through the soil to scoop out water retaining basins therein.

3. An implement of the class described comprising a horizontally disposed, rotatable shaft, a plurality of pocket forming blades fixed on said shaft and adapted to scoop out quantities of earth as the implement advances, a draft member, said shaft being journaled on said draft member for rotation as the implement is drawn forwardly with said blades in earth-engaging position, and means for controlling the speed of rotation of said shaft at a substantially constant rate as the implement moves forwardly, said rate of rotation being different from the speed of rotation resulting when the implement is allowed to roll freely so that the blades are periodically brought into contact with the ground and made to scrape through the soil.

4. An implement of the class described comprising a horizontally disposed, rotatable shaft, a plurality of pocket forming scraper blades fixed on said shaft, a draft member, said shaft being journaled on said draft member for rotation as the implement is drawn forwardly with said blades in earth engaging position, and means for retarding the speed of rotation of said shaft to a substantially constant rate below the rate of rotation resulting when the implement is allowed to roll freely upon the blades, whereby the blades are made to scrape through the soil at regular intervals to scoop out depressions therein which are adapted to catch and retain moisture.

5. In combination, a basin-forming device comprising a ground engaging scraper blade supported for rotation about a transverse axis for intermittent engagement with the ground and having a blunt end adapted to collect soil in front of the blade as the latter is advanced, means for advancing said device, and means for rotating said blade, as said device is advanced, at a peripheral speed less than the speed of advance so that the blade is dragged through the ground at intervals to scoop out moisture retaining basins.

6. In combination an earth engaging blade, means for supporting said blade for rotation about a transverse axis, said blade having a blunt end adapted to collect soil in front of said blade as the latter is advanced, means for advancing said blade, and means for causing said blade to rotate during advancement at a peripheral speed of said blunt end that is less than the speed of advancement.

7. A pocket forming implement of the class described comprising a rotatable assembly of radially extending earth-engaging basin-forming scraper blades adapted to roll along the ground as the implement is drawn forwardly, draft means therefor, and means for retarding the rotation of said assembly to a rate at which the peripheral speed of the assembly is less than the speed of advance of said implement, whereby said blades scoop out quantities of earth and deposit the latter as they advance, thereby forming a plurality of pockets and dams adapted to retain moisture.

8. A soil treating implement of the class described, comprising a draft frame, a transversely disposed shaft journaled for rotation in said frame, a plurality of earth-engaging blades fixed to said shaft and extending radially therefrom, said blades being adapted to rotate with said shaft by virtue of their contact with the ground as the implement moves forwardly, and means engaging said shaft to retard the speed of said shaft to cause said blades to drag through the soil for forming moisture receiving pockets therein.

9. A soil treating implement of the class described, comprising a draft frame, a transversely disposed shaft journaled for rotation in said frame, a plurality of earth-engaging blades fixed to said shaft and extending radially therefrom, said blades being adapted to rotate with said shaft by virtue of their contact with the ground as the implement moves forwardly, a brake drum fixed to said shaft, and a brake band embracing said drum and connected to said draft frame for retarding the speed of said shaft.

10. A soil treating implement of the class described, comprising a draft frame, a transversely disposed shaft journaled for rotation in said frame, a plurality of earth-engaging blades fixed to said shaft and extending radially therefrom, said blades being adapted to rotate with said shaft by virtue of their contact with the ground as the implement moves forwardly, and adjustable braking means engaging said shaft for determining the speed of rotation thereof.

11. In a pocket forming implement of the class described, a rotatable assembly of radially exending earth-engaging basin-forming scraper blades, draft means for drawing said assembly in rolling engagement with the ground, a ground engaging control wheel, and means connecting said wheel with said blade assembly for determining the peripheral speed of rotation of the latter at a rate different from the speed of advance of the implement so that said scraper blades are periodically dragged through the soil to scoop out quantities of earth to form water retaining basins in the ground.

12. In a pocket forming implement of the class described, a rotatable assembly of radially extending earth-engaging basin-forming scraper blades, draft means for drawing said assembly in rolling engagement with the ground, a ground engaging control wheel, and means connecting said wheel with said blade assembly for causing the latter to rotate with a peripheral speed lower than the speed of advance of said implement.

13. In a pocket forming implement of the class described, a rotatable assembly of radially extending earth-engaging blades, draft means for drawing said assembly in rolling engagement with the ground, a ground engaging control wheel, and a gear train operatively connecting said rotatable blade assembly with said control wheel whereby the speed of rotation of said assembly is retarded below its normal speed due to free rolling movement.

14. In combination with a tractor having a supporting wheel, an implement for forming moisture retaining pockets in the soil comprising a rotatable assembly of radially extending earth-engaging scraper blades, draft means connecting said assembly to said tractor for propelling the rotatable assembly in rolling engagement with the ground, and driving means connecting said assembly with said supporting wheel, for causing the assembly to rotate during forward movement of the tractor at a speed less than the normal speed of rotation due to free rolling movement so that the blades of said rotatable assembly are alternately brought into engagement with the soil to scrape out water retaining pockets therein and then moved out of engagement with the soil.

15. In combination with a tractor having a supporting wheel, an implement for forming moisture retaining pockets in the soil comprising a rotatable assembly of radially extending earth-engaging basin-forming scraper blades, draft means connecting said assembly to said tractor for propelling the rotatable assembly in rolling engagement with the ground, a sprocket fixed to said supporting wheel, a second sprocket fixed to said blade assembly, and a chain interconnecting said sprockets for causing the assembly to rotate during forward movement of the tractor at a speed less than the normal speed of rotation due to free rolling movement, whereby said blades are alternately dragged through the soil to scoop out moisture retaining pockets and then rotated out of contact with the ground.

16. In combination with a tractor having an engine driven shaft, an implement for forming moisture retaining pockets in the ground comprising a rotatable assembly of radially extending earth-engaging scraper blades, draft means connecting said assembly to said tractor whereby said rotatable assembly is drawn in engagement with the ground, and driving means connecting said assembly with said engine driven shaft, for causing the assembly to rotate during forward movement of the tractor at a speed less than the normal speed of rotation due to free rolling movement, whereby said blades are successively brought into and out of engagement with the ground to scrape out a series of discontinuous pockets therein.

17. In combination with a tractor having an engine driven power shaft, an implement for forming moisture retaining pockets in the ground comprising a rotatable assembly of radially extending earth-engaging scraper blades, draft means connecting said assembly to said tractor whereby said rotatable assembly is drawn in engagement with the ground, and power transmitting mechanism connecting said assembly with said power shaft, for determining the peripheral speed of said blades at a speed different from the speed of advance of said implement, whereby said blades are successively drawn through the soil to scrape out discontinuous depressions therein as the implement advances.

18. The combination with a tractor having a rear drive axle, of a pocket forming implement mounted at the rear of the tractor, said implement including a frame, a tool supporting shaft rotatably mounted on said frame, a plurality of radially extending soil-engaging scooping blades fixed on said shaft, and means for rotating said shaft from the drive axle of the tractor to successively bring said blades into engagement with the ground and form a series of moisture retaining pockets therein.

19. An implement for forming moisture retaining pockets in the ground comprising, in combination, a wheel supported frame adapted to travel between crop rows, cultivating tools supported on said frame and adapted to work the soil between said rows, an earth engaging blade supported on said frame behind said cultivating tools for rotation about a horizontal axis, said blade being adapted to collect the loose cultivated soil between the crop rows in front thereof as the implement is advanced, and means for rotating said blade as the implement advances so as to periodically drag the scraper blade through the soil and scoop out depressions therein.

20. In combination with a tractor having a supporting wheel, an implement for forming moisture retaining pockets in the ground comprising a frame adapted to be connected to the tractor, an earth-engaging blade supported on said frame for rotation about a horizontal axis, and driving means actuated by said supporting wheel for rotating said blade during forward movement of the tractor so that the blade is periodically brought into engagement with the ground to scoop out depressions therein.

21. An implement comprising, in combination, an earth-engaging blade, means for supporting said blade for rotation about a horizontal axis, said blade having a blunt end adapted to collect soil in front of the blade as the implement is advanced, means for advancing the implement, and driving means engaging the blade for rotating the latter as the implement is advanced, so that the blunt end of the blade is brought into contact with the ground at spaced intervals to scoop out depressions therein.

WALTER H. SILVER.